(12) United States Patent
Kuroha et al.

(10) Patent No.: US 6,715,932 B2
(45) Date of Patent: Apr. 6, 2004

(54) ECCENTRIC OPTICAL FIBER CONNECTOR FERRULE AND METHOD OF MANUFACTURING THE SAME

(75) Inventors: Toshiaki Kuroha, Yokohama (JP); Naotoshi Shiokawa, Kamagaya (JP)

(73) Assignee: Seikoh Giken Co., Ltd., Chiba-ken (JP)

( * ) Notice: Subject to any disclaimer, the term of this patent is extended or adjusted under 35 U.S.C. 154(b) by 223 days.

(21) Appl. No.: 09/879,955

(22) Filed: Jun. 14, 2001

(65) Prior Publication Data
US 2002/0061172 A1 May 23, 2002

(30) Foreign Application Priority Data
Jul. 25, 2000 (JP) .................................... 2000-223206

(51) Int. Cl.⁷ .................................................. G02B 6/36
(52) U.S. Cl. ........................................ 385/78; 385/67
(58) Field of Search .............................. 385/55, 60, 67, 385/123; 65/385

(56) References Cited

U.S. PATENT DOCUMENTS 5,815,619 A * 9/1998 Bloom ........................ 385/78
6,123,463 A * 9/2000 Kashihara et al. ............ 385/60

FOREIGN PATENT DOCUMENTS

JP         363228108 A * 9/1988 ................ 385/67

* cited by examiner

*Primary Examiner*—Edward J. Glick
*Assistant Examiner*—Therese Barber
(74) *Attorney, Agent, or Firm*—Venable LLP; Michael A. Sartori

(57) ABSTRACT

An eccentric optical fiber connector ferrule according to the present invention comprises an optical fiber in which a coating at an end thereof is removed to expose the end of the fiber, a metallic coating bonded to a part of a side face at the end of the optical fiber in an axial direction, and a ferrule receiving the end of the optical fiber, to which the metallic coating is bonded, in a central hole, for supporting it while applying a specified eccentricity. By recessing the optical fiber end face of the eccentric optical fiber connector ferrule from the ferrule end face by 0.2 to 2.0 $\mu$m, the damage at the end of the optical fiber can be prevented.

3 Claims, 5 Drawing Sheets

ECCENTRIC OPTICAL FIBER CONNECTOR FERRULE AND METHOD OF MANUFACTURING THE SAME

BACKGROUND OF THE INVENTION

1. Field of the Invention

The present invention relates to an eccentric optical fiber connector ferrule having a desired eccentricity and to the manufacturing method thereof.

2. Description of the Related Art

There is sometimes a need to accurately measure the eccentricity of an optical fiber core of an optical fiber jumper cable, to which a connector is connected, relative to the center of the outside diameter of a ferrule. A connector having a well-known eccentricity amount is used for this purpose. In connection of the optical fiber to the connector, an insertion loss IL (dB) due to an offset d between optical fiber axes is obtained in the following equation in case of a single-mode optical fiber.

$$IL(dB) = -10 log T \cdot exp|-(d/\omega)^2|$$

where, T: a transmission loss between the optical fibers
ω: the radius of a mode field of the optical fiber In this instance, assuming that T=0.93 and ω=4.1 μm, the insertion loss IL (dB) due to the offset d between the optical fiber axes is about 0.1 dB in the case where the offset d of optical axes is 0.5 μm, about 0.23 dB in case of 1 μm, and about 0.9 dB in case of 2 μm.

FIG. 3 shows a graph of the loss due to the offset between the optical fiber axes in connection of the optical fiber connector. It shows that as the offset between the optical fiber axes increase, the variations in loss also increase.

Generally, although the specification of the insertion loss of the jumper cable having the optical fiber ferrule varies depending on the usage and object thereof, almost all are within the range of 0.15 to 0.3 dB.

Assuming that a master connector is eccentric by around 0.3 μm, and the minimum insertion loss when the tested optical fiber ferrule is connected at various angles is 0.3 dB, it is found in FIG. 3 that the distance (the offset amount d) between the center of the master connector core and the center of the tested optical fiber core is around 1.2 μm. Accordingly, the tested optical fiber has the offset of around 1.5 μm. Consequently, the offset d when the tested ferrule is connected to an ideal optical fiber ferrule with the eccentricity of 0 is 1.5 μm, and the insertion loss is approximately 0.5 dB, exceeding the range of the above specifications.

On the other hand, assuming that the insertion loss of the tested optical fiber ferrule when using the master with no eccentricity is 0.2 dB, the offset d is about 0.6 μm; accordingly, even if the same type of optical fiber is connected in the direction in which the offset d is added, the added offset is around 1.2 μM m so that the insertion loss can be maintained within 0.5 dB (d=1.5 μm), ensuring a random connection (non-adjusted connection).

As described above, there is a need to accurately measure the eccentricity of the ferrule core in order to ensure the performance of the jumper cable to which the connector is mounted. The eccentric master optical fiber ferrule having any well-known eccentricity is required for this purpose. Particularly, a need exists for a connector with an eccentric master ferrule in which the eccentricity of 0.1 μm or less can be tested. For this purpose, it is required to determine the amount of the eccentricity of the tested optical fiber ferrule by the variation in the direction of 360° and to test the master with small eccentricity using an eccentric master connector in which the core is previously eccentric by 1 μm or more.

The method of manufacturing a conventional eccentric master connector will be briefly described with reference to the following examples.

First, prepare a ferrule with a large central hole, for example, a ferrule with the hole diameter of 130 gm. Insert an optical fiber with the outside diameter of 125 μm therein to form a connector ferrule in which the optical fiber is naturally separated from the central axis thereof. After securing the optical fiber with an adhesive or the like, determine the eccentricity of the optical fiber by observing the end face to measure the eccentricity.

However, it is not easy to manufacture an optical fiber connector ferrule with a specified eccentricity (or a desired amount of eccentricity) by the aforesaid method.

Also, the optical fiber ferrule is sometimes manufactured in a manner in which the optical fiber winds in the central hole of the ferrule in the process of manufacturing the master optical fiber connector ferrule. In general, when measuring a number of tested connector using the master, the end of the master optical fiber connector may be damaged. In such a case, if the defect is removed by polishing the surface of the master connector again, the eccentricity of the ferrule manufactured in the state in which the optical fiber winds may vary, or the master optical fiber axis may incline with respect to the center of the outside diameter of the ferrule.

Referring to FIGS. 4A, 4B, and 4C, the foregoing problems will be described. FIG. 4A is a cross sectional view of the master manufactured in a state in which the optical fiber winds in the central hole of the ferrule, which is exaggeratedly shown for easy understanding. FIG. 4B is a cross sectional view taken on line c—c and FIG. 4C is a cross sectional view taken on line b—b in FIG. 4A. The shape of the cross section when ends of a ferrule 3 and an optical fiber 1 are polished to the position indicated by line b—b is the same (the eccentricity is constant) as that of a view taken on line a—a in FIG. 4A; however, the optical axis of an optical fiber core 1A is inclined relative to a center line O—O of the hole of the ferrule 3. When polishing to a position indicated by line c—c, the eccentricity also varies and the optical axis of the optical fiber core 1A is inclined also relative to the center line O—O of the hole of the ferrule 3.

When measuring the insertion loss due to the eccentricity of the jumper cable using the eccentric master optical fiber ferrule with the well-known eccentricity, it is required to connect the eccentric master optical fiber ferrule to the tested optical fiber ferrule and to rotate it in the direction of 360°. In this case, since the optical fiber end of the eccentric master optical fiber ferrule is brought into contact with the ferrule or the optical fiber of the tested optical fiber ferrule and is rotated, defects may be formed at the surface to damage the optical characteristics. When rotating a tested optical fiber ferrule Fe and an eccentric master optical fiber ferrule Fes in a state in which the ends are brought into contact with each other in a sleeve S1 as shown in FIG. 5A, the ends of both optical fibers OF may be damaged.

SUMMARY OF THE INVENTION

Accordingly, it is an object of the present invention to provide a stable eccentric ferrule that is parallel to a ferrule-hole axial direction, to which a specified amount (a desired amount) of eccentricity is applied.

It is another object of the present invention to provide a method of manufacturing the eccentric master ferrule with the stable characteristic, to which arbitrary eccentricity is applied.

It is another object of the present invention to provide a stable eccentric ferrule and the manufacturing method in which the shape of an end of the eccentric master optical fiber ferrule is reformed to prevent generation of damage due to the contact and movement relative to a tested optical fiber ferrule.

In order to achieve the above objects, an eccentric optical fiber connector ferrule according to the present invention includes an optical fiber in which a coating at an end thereof is removed to expose the end thereof, a metallic coating bonded to a part of the side face of the optical fiber end in an axial direction, and a ferrule receiving the end of the optical fiber to which the metallic coating is bonded in a central hole thereof, for supporting it while applying a specified eccentricity.

In the eccentric optical fiber connector ferrule, the metallic coating at the side face of the optical fiber end is applied to a part of 1800 or less on the outer periphery of the optical fiber, and the ferrule has a central hole with the outside diameter of the optical fiber plus the thickness of the metallic coating.

In the eccentric optical fiber connector ferrule, the optical fiber end face is recessed from the end of the ferrule within the range of 0.2 to 2.0 μm.

In order to achieve the above objects, a method of manufacturing an eccentric optical fiber connector ferrule according to the present invention includes the steps of removing the coating of the optical fiber and exposing an end of the optical fiber, performing pretreatment of the end of the optical fiber for plating, masking a part of the circumference at the end of the optical fiber except for a part of an arbitrary angle with paint, performing electroless metal plating to the end of the optical fiber so masked, and inserting the end of the optical fiber so metal plated in the central hole of the ferrule for securing.

In the method of manufacturing an eccentric optical fiber connector ferrule, the angle width of the masking is 180° or more on the circumference at the side of the optical fiber, and more preferably, a part of around 45 to 90° on the circumference is exposed.

In the method of manufacturing an eccentric optical fiber connector ferrule, there is provided the step of previously etching a clad of the optical fiber with an etchant to decrease the clad diameter.

In the method of manufacturing an eccentric optical fiber connector ferrule, there is provided the step of etching a clad of the exposed optical fiber with an etchant after metal plating to decrease the clad diameter.

In the method of manufacturing an eccentric optical fiber connector ferrule, the optical fiber end face is recessed from the end of the ferrule within the range of 0.2 to 2.0 μm by the mechanical or chemical treatment.

In the method of manufacturing an eccentric optical fiber connector ferrule, subsequently to the step of inserting the metal-plated optical fiber end in the central hole of the ferrule for securing, the method further includes the steps of performing an ordinary polishing of end faces of the ferrule and the optical fiber to smooth the end faces of the ferrule and the optical fiber at the center thereof, and recessing the faces so smoothed by buffing or etching with the etchant.

DESCRIPTION OF THE PREFERRED EMBODIMENTS

Figure 1:
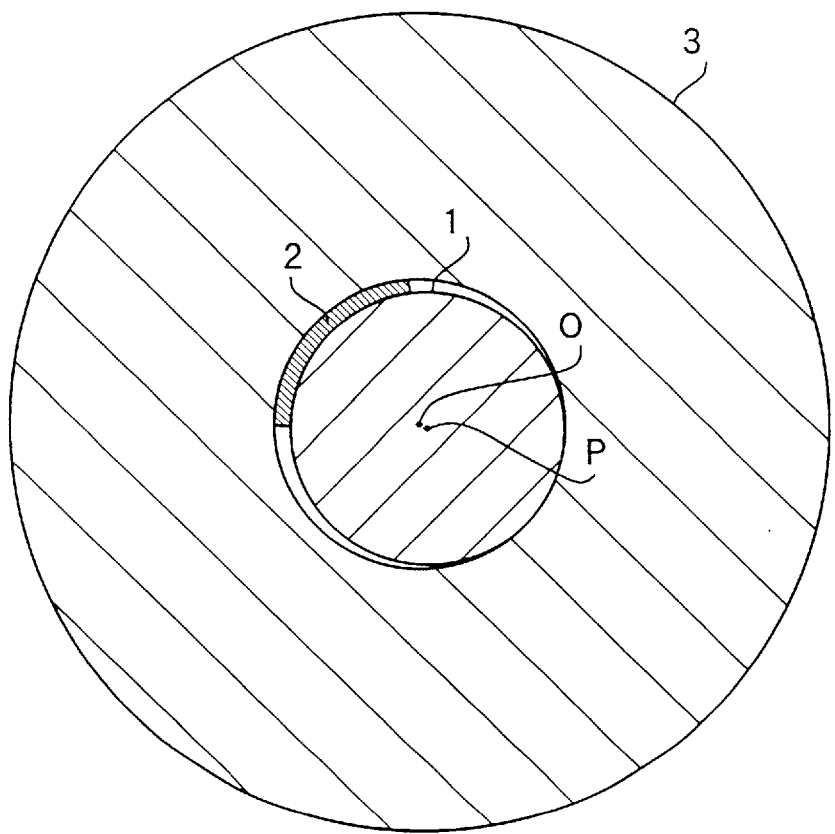
FIG. 1 is an enlarged cross sectional view of an embodiment of an eccentric optical fiber ferrule according to the present invention.
Figure 2:
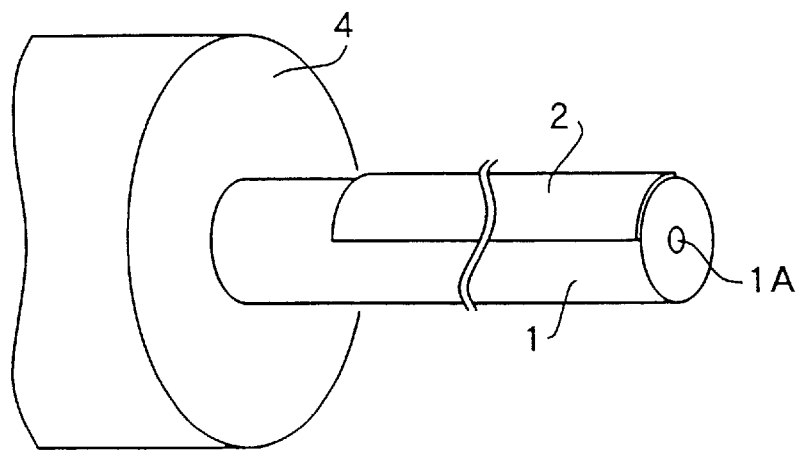
FIG. 2 is a perspective view showing an adhesion state of a metallic coating at an end of an optical fiber used in the eccentric optical fiber ferrule according to the present invention.

Embodiments of an eccentric optical fiber connector ferrule according to the present invention will be described hereinbelow with reference to the drawings or the like. FIG. 1 is an enlarged cross sectional view of an embodiment of an eccentric optical fiber connector ferrule according to the present invention. FIG. 2 is a perspective view showing an adhesion state of a metallic coating at an end of an optical fiber used in the eccentric optical fiber connector ferrule according to the present invention. A metallic coating 2 is adhered to a side face at the end of an optical fiber 1 in which a coating 4 is removed. The metallic coating 2 is applied to a part of 180° or less on the circumference at the side face of the optical fiber. An end of the optical fiber 1 is inserted and secured in an inside diameter 1A of a ferrule 3. In FIG. 1, reference character O denotes a central axis of a center hole of the ferrule, and P denotes an optical axis of the optical fiber 1. The distance between O and P is an eccentricity amount of the optical axis and which is almost equal to a half of the thickness of the metallic coating 2; accordingly, the eccentricity can be arbitrarily set by adjusting the outside diameter of the optical fiber 1 and the thickness of the metallic coating 2.

In partial plating of the optical fiber end side face, a part of 180° or more on the circumference at the side of the optical fiber, in which pretreatment (sensitizing or activating) of electroless plating is completed, is subjected to masking with an organic paint and is then plated with electroless nickel. Subsequently, electroplating is performed to a desired thickness. The partial plating is applied in this manner; generally, it is appropriate to plate to the thickness of 3 to 5 μm on a part of 45 to 90° on the circumference. When plating the optical fiber with the diameter of 125 μm to 3 to 5 μm in thickness, the maximum diameter becomes 128 to 130 μm so that a preferable ferrule may not be provided. In this case, adjustment can be performed by decreasing the diameter of the optical fiber by etching or the like prior to applying the metallic coating or by finely etching only the optical fiber portion after metal coating.

Figure 5A:
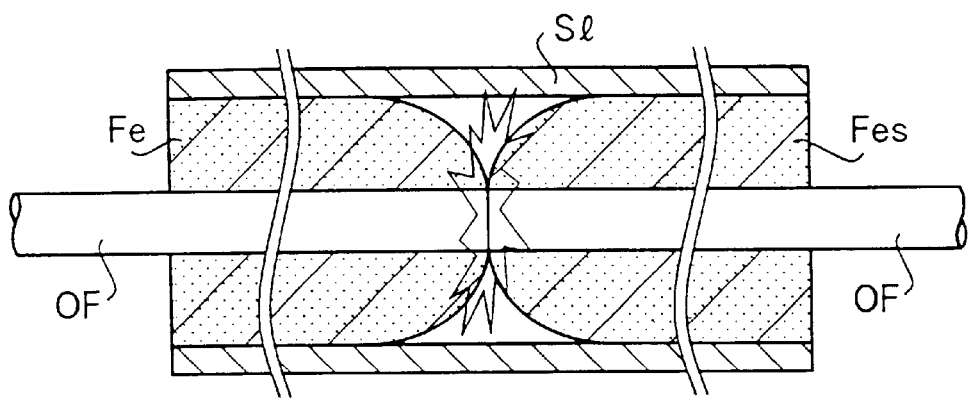
FIGS. 5A and 5B are explanatory views showing problems occurring in the contact of the end faces of the optical fibers and a reform according to the present invention in comparison with each other.

When the optical fiber end face and the ferrule end face are on the same face, the end of the optical fiber of the eccentric master ferrule and the end of the optical fiber of the tested optical fiber ferrule may be damaged in the process of measuring the plurality of tested optical fiber ferrules using the eccentric master ferrule. The problems were previously described with reference to FIG. 5A. In order to prevent such problems, in the ferrule according to the present invention, only the optical fiber at the center of the eccentric master connecter is recessed from the end of the optical fiber by 0.2 to 2.0 μm. Accordingly, as shown in FIG. 5B, a gap G corresponding to the above described length of 0.2 to 2.0 μm is provided between the optical fiber OF of the tested optical fiber ferrule Fe and an optical fiber OFm of an eccentric master ferrule Fesm.

Since a projection amount of the optical fiber end face of the tested optical fiber ferrule Fe is a maximum of about 0.1 μm from the end face of the optical fiber ferrule, a recessed amount of the optical fiber OFm of the eccentric master ferrule Fesm is set to 0.2 μm or more. In this way, the ends of the optical fibers or the ferrule of the tested optical fiber ferrule Fe and the optical fiber OFm of the eccentric master ferrule Fesm are not brought into contact with each other.

Figure 3:
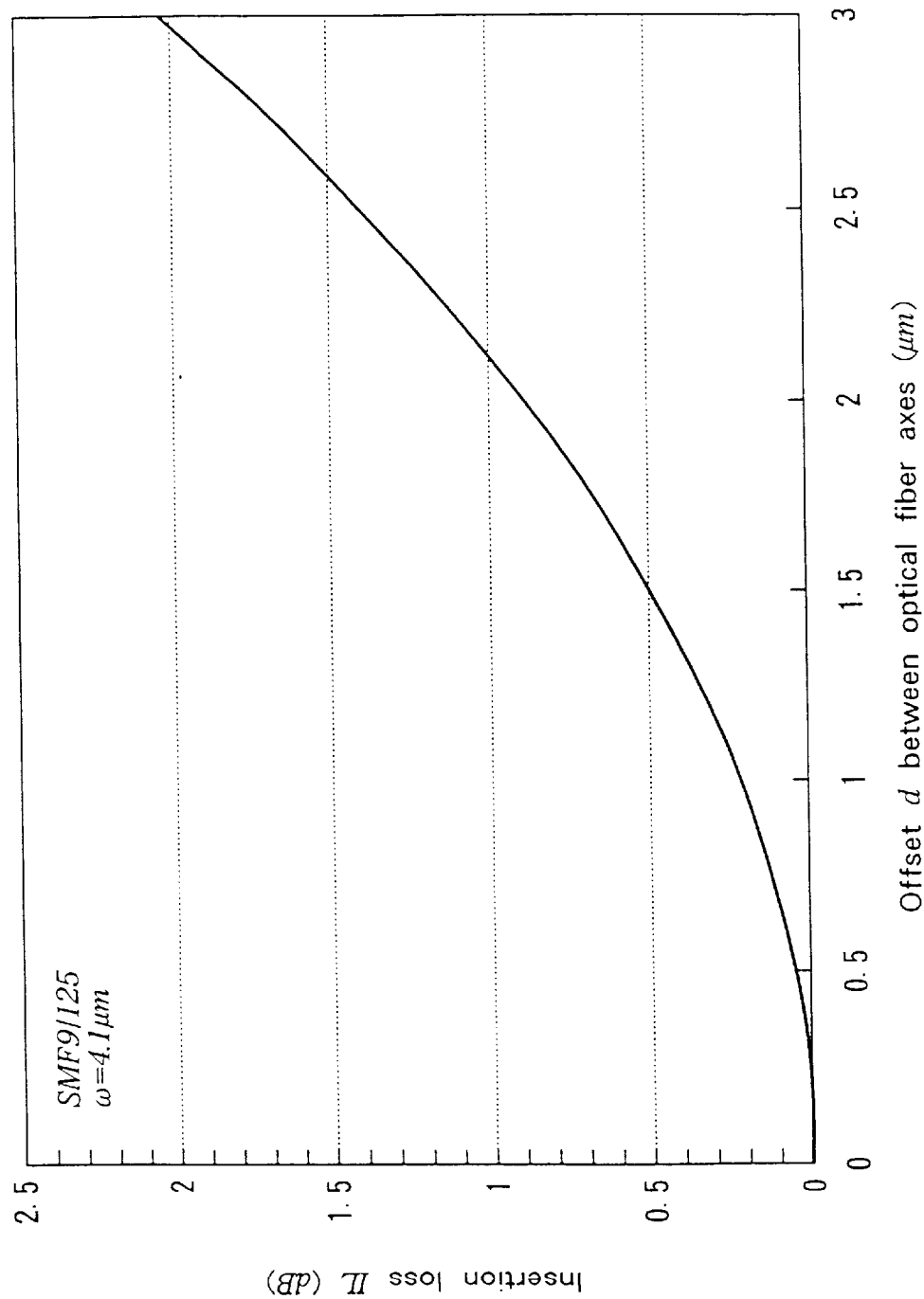
FIG. 3 is a graph showing the relation between the offset of optical fiber axes and the damping amount in connection of an optical fiber connector.
Figure 4A:
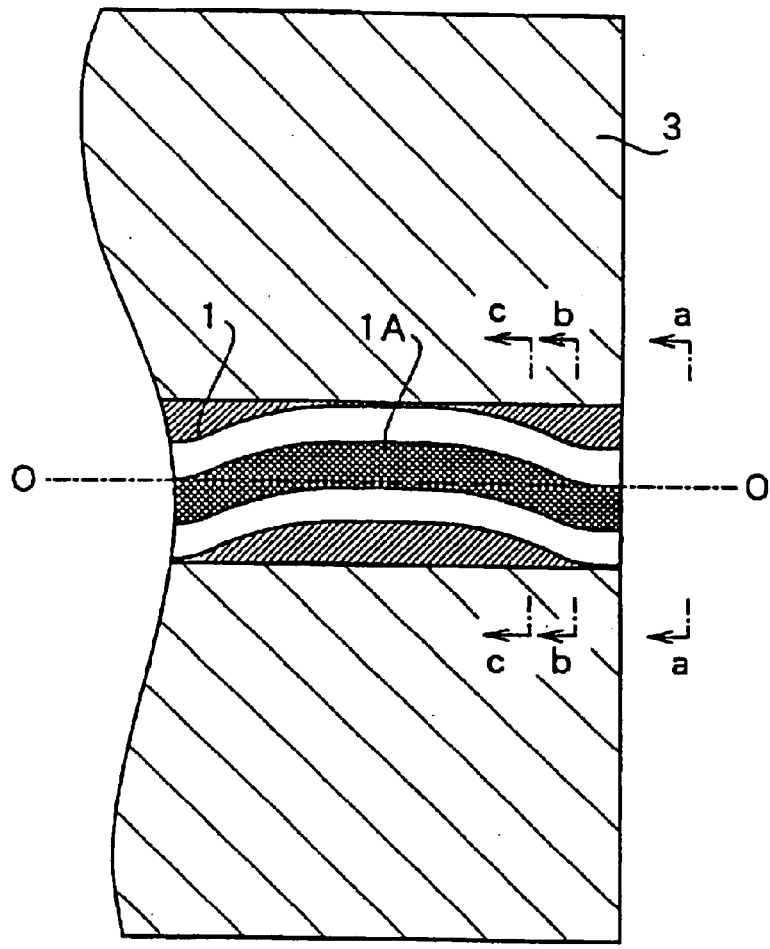
FIG. 4A is a cross sectional view of a master manufactured in a state in which an optical fiber winds in a center hole of the ferrule.
Figures 4B, 4C:
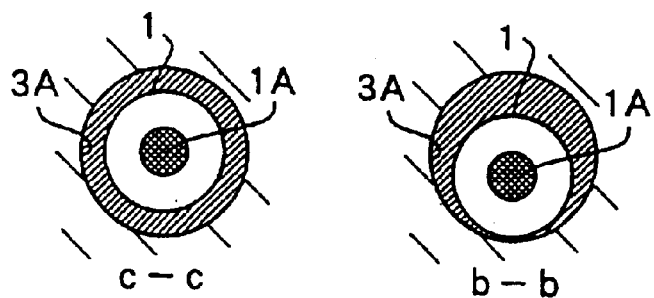
FIG. 4B is a view showing a cross section taken on line b—b.
FIG. 4C is a cross section taken on line c—c in FIG. 4A.
Figure 5B:
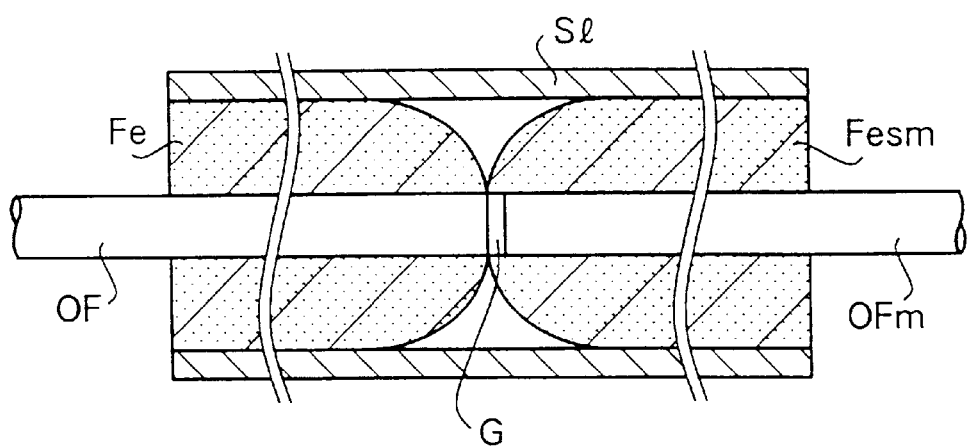
Figure 6:
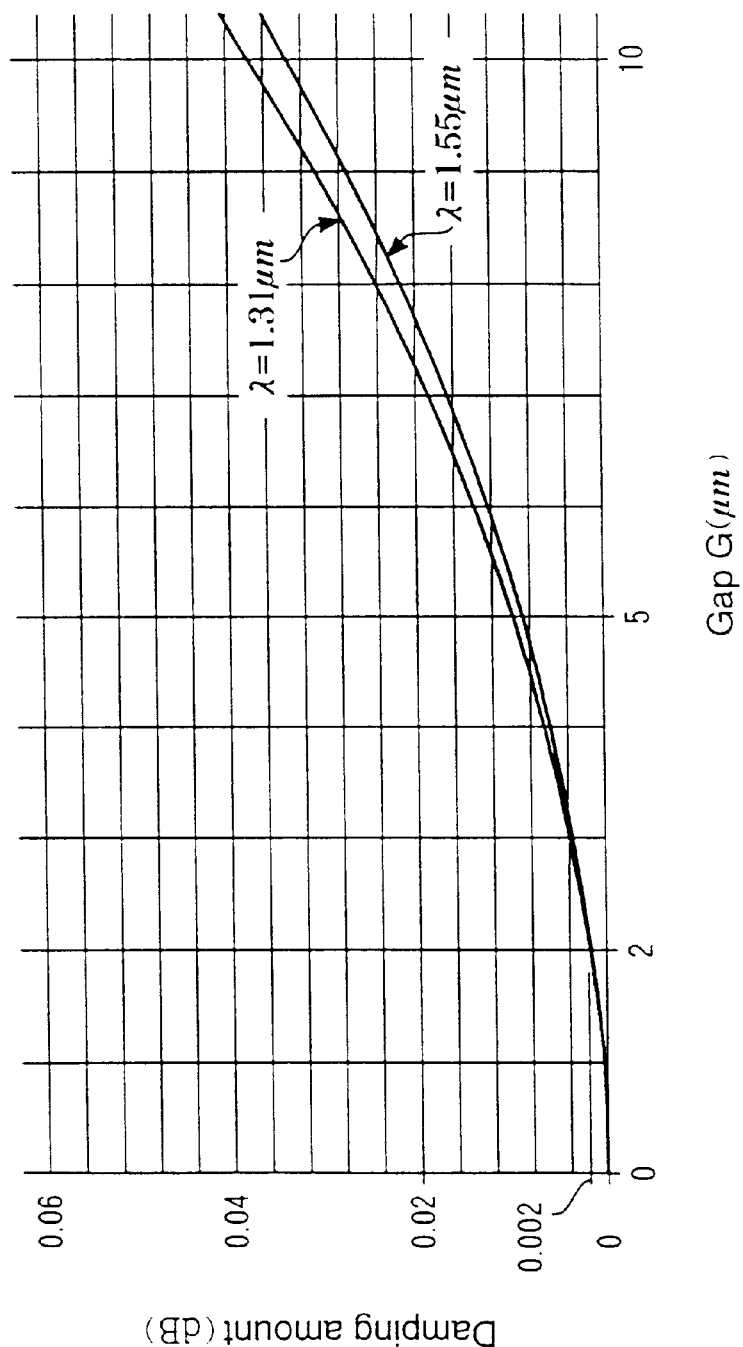
FIG. 6 is a graph showing the relation between a gap G and the damping amount in connection of the optical fiber in FIG. 5B.

The gap G shown in FIG. 5B is preferably large from the viewpoint of protecting the optical fiber OFm of the eccentric master ferrule Fesm. However, the gap G is preferably small from the viewpoint of the resolution of testing the eccentricity. FIG. 6 shows the relation between the gap G and the damping amount in the connection shown in FIG. 5B. The eccentric resolution of testing the eccentricity is desirably 0.5 μm. The insertion loss corresponding to the eccentric resolution is found to be 0.002 dB in FIG. 3 (or the equation described in Related Art). When the gap G exceeds 2.0 μm as shown in FIG. 6, the damping amount due to the gap exceeds the aforesaid 0.002 dB. When the gap G exceeds 2.0 μm, the eccentric resolution cannot be maintained. Accordingly, the gap G is required to be within 2.0 μm.

The process of obtaining the gap G, that is, the process of recessing only the optical fiber at the center of the eccentric master connecter will now be briefly described. First, the end face of the eccentric master ferrule Fesm is subjected to ordinary polishing to smooth the end faces of the ferrule and the optical fiber at the center thereof. Next, buffing is performed to recess only the optical fiber at the center. Alternatively, etching is performed with etchant for recessing.

EXAMPLES

Example 1

A coating at a terminal of a single-mode optical fiber with the diameter of 125 μm was removed and the optical fiber is then dipped in a sensitizer solution and $Sn^{2+}$ was adsorbed to the surface thereof that was made hydrophilic.

After washing with water, the optical fiber was dipped in an activator solution to deposit Pd crystal by a redox reaction.

After washing with water and drying, an organic paint is applied to a part of about 270° on the circumference at the side of the optical fiber and is then dried, and subsequently, which was dipped in an electroless nickel-plating solution for two minutes to form an electroconductive film of 0.5 to 1.0 μm.

Furthermore, the optical fiber was subjected to electroplating at a current density of $5A/dm^{2+}$ for three minutes using a nickel sulfamate electrolyte.

After washing with water and drying, the organic paint was removed using acetone.

In the sample so obtained, a metal was electroplated at a part of about 90° on the circumference at the side of the optical fiber and the thickness was 3.8 μm.

The optical fiber was inserted in a ferrule with a center hole diameter of 129 μm and is subjected to a connector mounting process, thereby obtaining an eccentric master. As a result of observing the ferrule end face, the eccentricity of the core relative to the center of the central hole of the ferrule was 1.9 μm.

Example 2

After a coating of a terminal of a single-mode optical fiber for 1.3 μm was removed, the optical fiber was dipped in a hydrofluoric acid water solution (1:4), and the outer periphery of the optical fiber was etched to obtain a clad diameter (outside diameter of the fiber) of 121 μm.

As a result, the thickness of the metallic coating was 3.8 μm, and which was inserted in a ferrule with a center hole diameter of 125 μm; consequently, the offset of the central axis of the core was 1.9 μm.

Measuring Eccentricity

The insertion loss was measured with respect to a master connector (connector 1) with a small eccentricity and a connector (connector 2) with a slight eccentricity using the eccentric master (the eccentricity of 1.9 μm) formed by the manufacturing method in Example 1 while varying the rotation angle at intervals of 90°, respectively.

TABLE 1

| | Insertion loss (dB) | | | |
|---|---|---|---|---|
| Rotation angle: | 0° | 90° | 180° | 270° |
| Connector 1 | 0.94 | 0.91 | 0.94 | <u>0.97</u> |
| Connector 2 | 0.44 | 0.96 | <u>1.32</u> | 0.98 |

As a result, it was determined that the master connector (connector 1) with a small eccentricity has the eccentricity of a little less than 0.1 μm in the direction of 270° and the connector (connector 2) with eccentricity has the eccentricity of around 5 μm in the direction of 180°.

Example 3

After an eccentric master was formed by the manufacturing method Similar to Example 1, buffing was performed for 30 minutes using cerium oxide as an abrasive lubricant. As a result of observing the ferrule end face, it was determined that the central optical fiber was recessed from the ferrule end face

Measuring Eccentricity

The connection loss was measured with respect to the master connector (connector 1) with a small eccentricity and the connector (connector 2) with a slight eccentricity using the eccentric master (the eccentricity of 1.9 μm) formed by the manufacturing method in Example 3 while varying the rotation angle at intervals of 90°, respectively.

TABLE 2

| | Insertion loss (dB) | | | |
|---|---|---|---|---|
| Rotation angle: | 0° | 90° | 180° | 270° |
| Connector 1 | 1.15 | 1.11 | 1.14 | <u>1.17</u> |
| Connector 2 | 0.64 | 1.16 | <u>1.54</u> | 1.19 |

The results showed a close approximation to the measurement of eccentricity.

As described above specifically, according to the present invention, there is provided a stable eccentric master ferrule that is parallel to the ferrule hole axial direction, to which a specified amount (a desired amount) of eccentricity is applied. Also, according to the manufacturing method of the present invention, an eccentric master ferrule having a stable characteristic, to which an arbitrary eccentricity is applied, can be manufactured.

In addition, according to the present invention, since the optical fiber end face of the eccentric master ferrule is recessed from the ferrule end face, there is no possibility that the optical fiber will be damaged.

Various modifications are possible within the scope of the present invention with respect to the above particularly described embodiments. An example of nickel was shown as a metallic layer for coating, other metals such as copper, gold, and silver can also be used.

What is claimed is:

1. An eccentric optical fiber connector ferrule comprising:

an optical fiber in which a coating at an end thereof is removed to expose the end thereof;

a metallic coating bonded to a part of the side face of the optical fiber end in an axial direction; and a ferrule receiving the end of the optical fiber to which the metallic coating is bonded in a central hole thereof, for supporting it while applying a specified eccentricity.

2. An eccentric optical fiber connector ferrule according to claim 1, wherein:

the metallic coating at the side face of the optical fiber end is applied to a part of 180° or less on the outer periphery of the optical fiber; and the ferrule has a central hole with the outside diameter of the optical fiber plus the thickness of the metallic coating.

3. An eccentric optical fiber connector ferrule according to claim 1 or 2, wherein the optical fiber end face is recessed from the end of the ferrule within the range of 0.2 to 2.0 $\mu$m.

* * * * *